United States Patent [19]
Wortman

[11] Patent Number: 6,156,972
[45] Date of Patent: Dec. 5, 2000

[54] INNER BEZEL FOR A COMPUTER CHASSIS

[75] Inventor: Michael Wortman, Roseville, Calif.

[73] Assignee: Hewlett-Packard Company, Palo Alto, Calif.

[21] Appl. No.: 09/302,709

[22] Filed: Apr. 30, 1999

[51] Int. Cl.[7] .............................. H02G 3/14; H05K 5/03
[52] U.S. Cl. .............................. 174/66; 220/241; 220/3.8
[58] Field of Search .................. 174/50, 66; 220/241, 220/3.8

[56] References Cited

U.S. PATENT DOCUMENTS

| | | | |
|---|---|---|---|
| 2,880,262 | 3/1959 | Bell et al. | 174/50 |
| 3,197,549 | 7/1965 | Good | 174/66 |
| 4,706,808 | 11/1987 | Guetersloh | 220/3.8 X |
| 5,126,510 | 6/1992 | Bauer et al. | 174/50 X |
| 5,218,169 | 6/1993 | Riceman | 174/67 |

*Primary Examiner*—Dean A. Reichard
*Attorney, Agent, or Firm*—David A. Plettner

[57] ABSTRACT

A bezel attaches to a chassis via pins that register the alignment of the bezel with respect to the chassis, and snap latches that retain the bezel to the chassis. The bezel of the present invention has one or more molded pins and one or more snap latches. The pins are tapered and extend out from the chassis farther than the snap latches. To assemble the bezel to a chassis, the pins are aligned with corresponding holes in the chassis. Since the pins are longer than the snap latches, the pins are easily positioned and partially inserted into the holes before it is necessary to depress the snap latches. Furthermore, since the pins are tapered, initial insertion of the pins into the holes is simplified. After aligning the pins and partially inserting the pins into the holes, the snap latches are depressed, thereby allowing the snap latches to be easily inserted into corresponding slots of the chassis as the bezel is pressed flush against the chassis. Thereafter, the snap latches are released. The bezel is held firmly in place against the chassis by tabs on the snap latches, which are in contact with an opposite face of the chassis. Furthermore, the firm seating of the tapered pins in the holes minimizes movement of the bezel from side to side and up and down. The bezel is easily removed by depressing the snap latches and pulling the bezel out.

7 Claims, 5 Drawing Sheets

6,156,972

INNER BEZEL FOR A COMPUTER CHASSIS

FIELD OF THE INVENTION

The present invention relates to bezels that are attached to computer chassis. More specifically, the present invention relates to a bezel that is attached to a computer chassis using molded pins and snap latches

DESCRIPTION OF THE RELATED ART

In the art of computing, computer systems and related equipment are often mounted in racks. Typically, a system is mounted in a rack as a bare chassis, and a cover is placed over the system. To enhance the aesthetic appearance of a rack-mounted system, one or more bezels are often attached to the system. The bezels protrude through the cover, and are typically used to present switches, displays, and other control-related functions to the computer operator.

In the prior art, bezels are typically attached to a chassis using various attachment hardware. The assembly of the bezel to the chassis requires significant assembly steps since the bezel must first be held in place, and then the attachment hardware must be applied to attach the bezel to the chassis. As is known in the art, it is desirable to reduce component counts and assembly steps wherever possible.

SUMMARY OF THE INVENTION

The present invention is a bezel that attaches to a chassis via pins that register the alignment of the bezel with respect to the chassis, and snap latches that retain the bezel to the chassis. In accordance with the present invention, a bezel has one or more molded pins and one or more snap latches. The pins are tapered and extend out from the chassis farther than the snap latches.

When a bezel in accordance with the present invention is attached to a chassis, the pins are aligned with corresponding holes in the chassis. Since the pins are longer than the snap latches, the pins are easily positioned and partially inserted into the holes before it is necessary to depress the snap latches. Furthermore, since the pins are tapered, initial insertion of the pins into the holes is simplified.

After the pins are aligned with and inserted partially into the holes, the snap latches are depressed. When depressed, the snap latches are easily inserted into corresponding slots of the chassis as the bezel is pressed flush against the chassis. Thereafter, the snap latches are released.

The bezel is held firmly in place against the chassis by tabs on the snap latches, which are in contact with an opposite face of the chassis. In addition, the firm seating of the tapered pins in the holes minimizes movement of the bezel from side to side and up and down. The bezel is easily removed by depressing the snap latches and pulling the bezel out.

Accordingly, the present invention simplifies the assembly of a bezel to a chassis. Furthermore, no mounting hardware is required. Therefore, the present invention reduces cost by reducing the component count and reducing the assembly steps required to mount the bezel to the chassis.

DETAILED DESCRIPTION OF THE PREFERRED EMBODIMENTS

Figure 1:
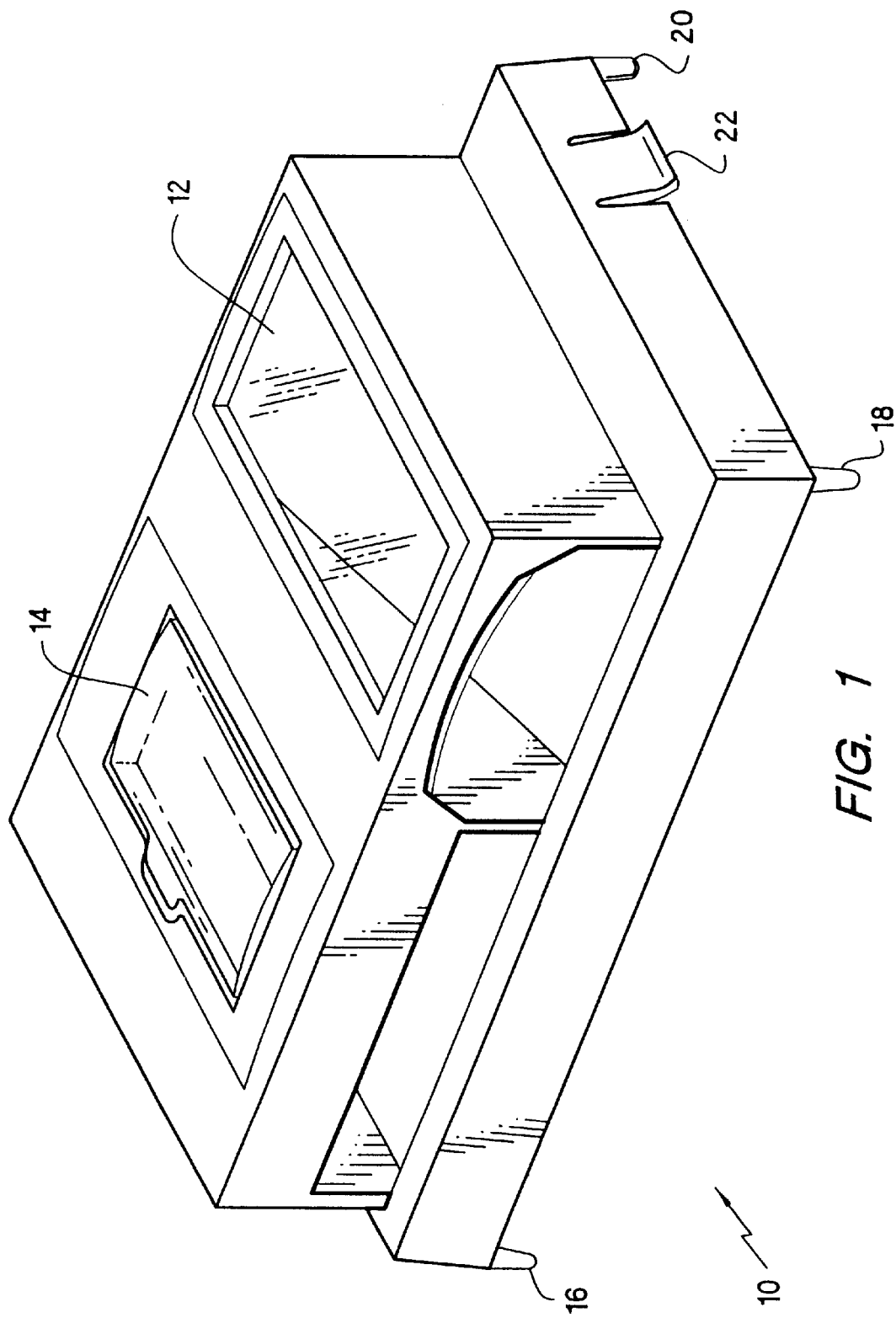
FIG. 1 is a perspective view from above a computer bezel in accordance with the present invention.

FIG. 1 is a perspective view from above a computer bezel 10 in accordance with the present invention. Bezel 10 includes a window 12 through which display indicator lights may be observed and a hinged door 14 that allows an operator to access a switch. Bezel 10 also includes molded pins 16, 18, 20, and an additional pin not seen in FIG. 1, and snap latch 22 and an additional snap latch not seen in FIG. 1.

Figure 2:
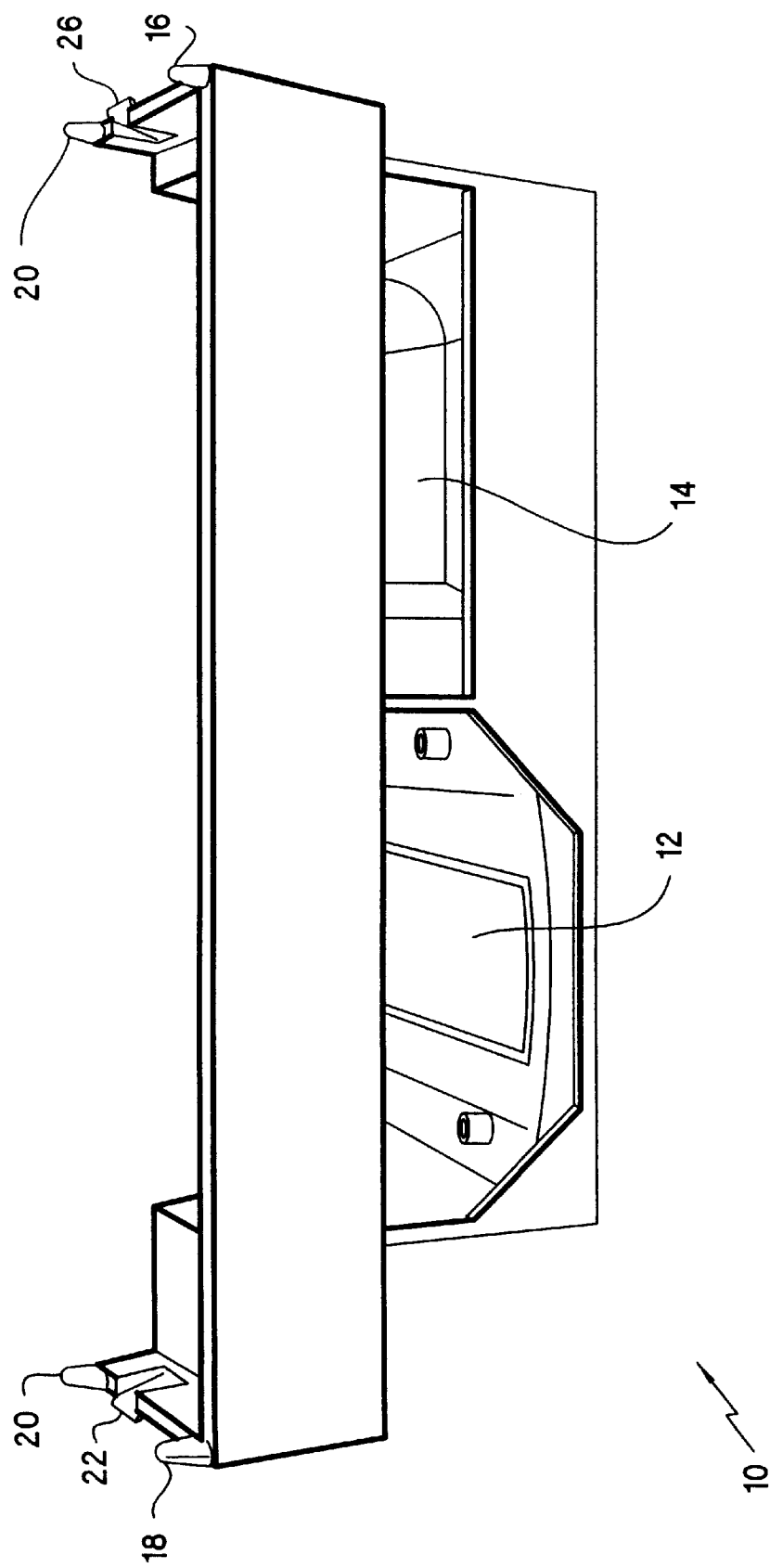
FIG. 2 is a perspective view of the other side of the bezel shown in FIG. 1.

FIG. 2 is a perspective view of the other side of bezel 10. In FIG. 2, molded pin 24 and snap latch 26 are also visible.

Figure 3:
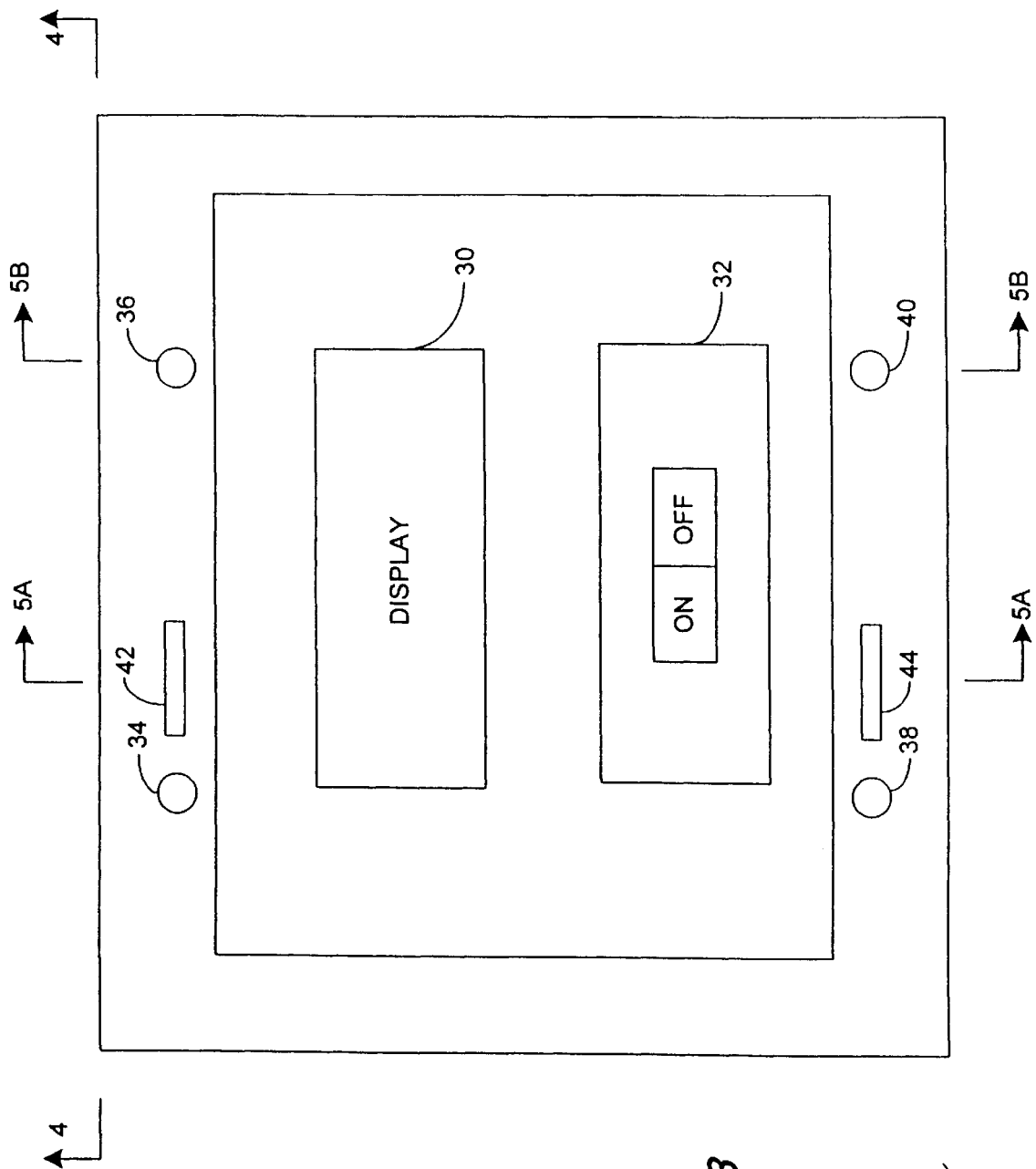
FIG. 3 shows a portion of a computer chassis that is adapted to be attached to the bezel shown in FIGS. 1 and 2.

FIG. 3 shows a portion of a computer chassis 28 that is adapted to be attached to bezel 10 of FIGS. 1 and 2. Chassis 28 includes a display 30 and a switch 32. Chassis 28 also includes holes 34, 36, 38, and 40 and slots 42 and 44. When bezel 10 is attached to chassis 28, pin 20 is inserted into hole 34, pin 18 is inserted into hole 36, pin 24 is inserted into hole 38, and pin 16 is inserted into hole 40. Furthermore, bezel 10 is retained to chassis 28 by snap latch 22, which is inserted into slot 42, and snap latch 26, which is inserted into slot 44.

Figure 4:
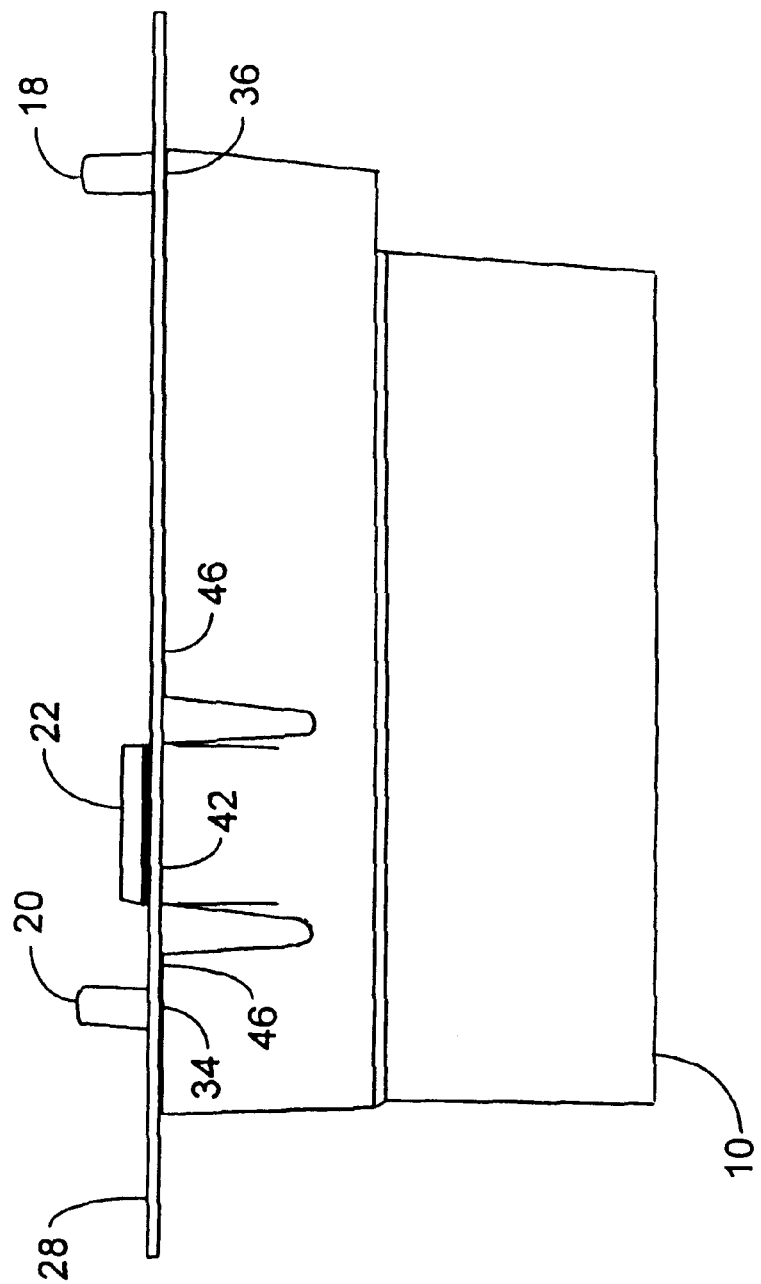
FIG. 4 is a view taken along line 4—4 of FIG. 3 with the bezel of FIGS. 1 and 2 attached to the chassis of FIG. 3.

FIG. 4 is a view taken along line 4—4 of FIG. 3 with bezel 10 attached to chassis 28. As indicated above, pin 20 is inserted into hole 34, pin 18 is inserted into hole 36, and snap latch 22 is inserted into slot 42. Note that the pins are tapered. This allows easy registration of the pins within the holes when attaching bezel 10 to chassis 28, while also minimizing movement from side to side and up and down after bezel 10 is firmly seated in place. Also, the pins are significantly longer than the snap latches. This allows the pins to be easily aligned with and partially inserted into the holes before it is necessary to depress the snap latches. Also note that snap latch 22 has a tab that retains bezel 10 in place, as dies snap latch 26. Accordingly, bezel 10 is held firmly in place by the tab applying force from the back of chassis 28, thereby pulling surfaces 46 of bezel 10 tight up against the front of chassis 28.

Figure 5B:
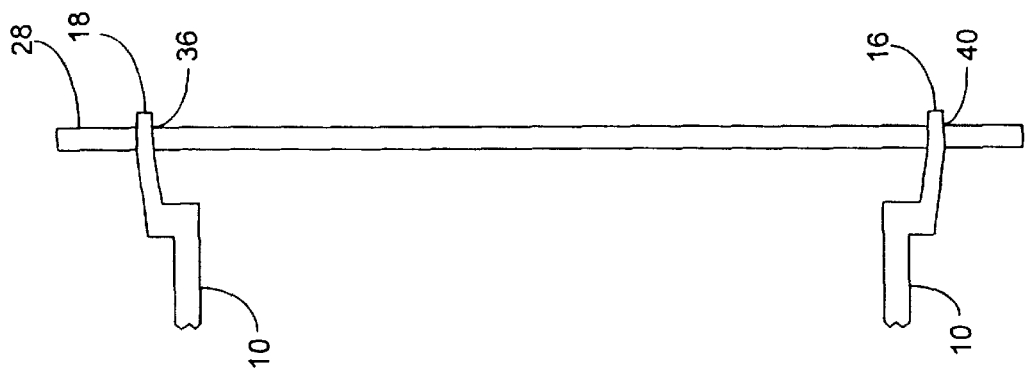
FIG. 5B is a side view taken along line 5B—5B in FIG. 3, and shows the bezel of FIGS. 1 and 2 attached to the chassis of FIG. 3 and illustrates how molded pins of the bezel are inserted into holes of the chassis to reduce movement of the bezel from side to side and up and down.
Figure 5A:
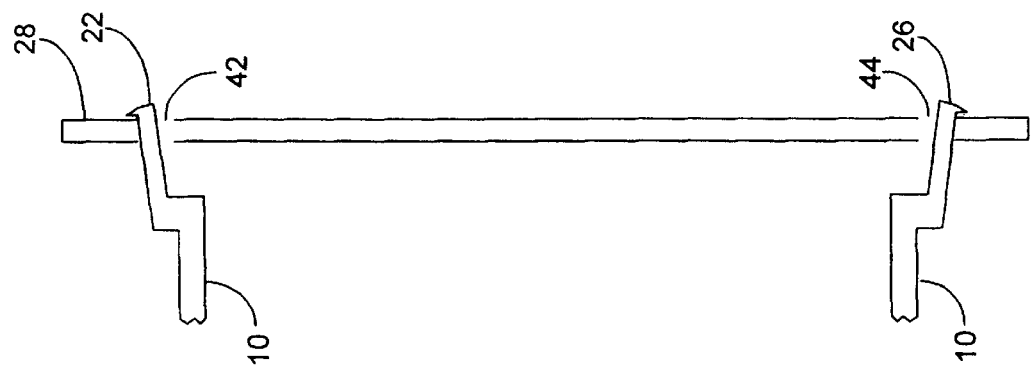
FIG. 5A is side view taken along line 5A—5A in FIG. 3, and shows the bezel of FIGS. 1 and 2 attached to the chassis of FIG. 3 and illustrates how snap latches are used to retain the bezel to the chassis.

FIG. 5A is side view taken along line 5A—5A in FIG. 3, and also shows bezel 10 attached to chassis 28. In FIG. 5A, snap latch 22 protrudes through slot 42, and the tab of snap latch 22 is applying force to the back of chassis 28. Likewise, snap latch 26 protrudes through slot 44, and the tab of snap latch 26 is applying force to the back of chassis 28. Note that slots 42 and 44 include enough clearance to allow bezel 10 to be easily attached to or removed from chassis 28 by simply flexing snap latches 22 and 26, respectively.

FIG. 5B is a side view taken along line 5B—5B in FIG. 3. As in FIG. 5A, FIG. 5B shown bezel 10 attached to chassis 28. However, FIG. 5B shows pin 18 inserted into hole 36, and pin 16 inserted into hole 40. As noted above, the pins are tapered, which allows the pins to be seated snugly in the holes when bezel 10 is held flush against chassis 28 by the snap latches.

The present invention provides a bezel that may be attached to a computer chassis in one easy step. The pins are simply aligned with and partially inserted into the holes, the snap latches are depressed, and the bezel is pressed onto the chassis. After the snap latches are released, the snap latches hold the bezel securely to the chassis. In addition, no mounting hardware is required. Accordingly, the present invention reduces the component count and reduces the assembly steps required to mount the bezel to the chassis, and thereby reduces cost.

Although the present invention has been described with reference to preferred embodiments, workers skilled in the art will recognize that changes may be made in form and detail without departing from the spirit and scope of the invention.

What is claimed is:

1. A bezel capable of being attached to a chassis comprising:
   one or more pins extending from the bezel and disposed to be inserted into corresponding holes of the chassis; and
   one or more snap latches extending from the bezel and disposed to be inserted into corresponding slots of the chassis when the one or more snap latches are flexed, wherein the one or more snap latches each include a tab that contacts an opposite face of the from a face of the chassis on which the the bezel is positioned chassis when the bezel is attached to the chassis.

2. The bezel of claim 1 wherein the one or more pins are tapered.

3. The bezel of claim 1 wherein the one or more pins extend farther from the bezel than the one or more snap latches.

4. A bezel and chassis assembly comprising:
   one or more pins extending from the bezel into holes of the chassis; and
   one or more snap latches extending into slots of the chassis, wherein the one or more snap latches include a tab in contact with an opposite face of the from a face of the chassis on which the bezel is positioned chassis.

5. The bezel and chassis assembly of claim 4 wherein the one or more pins are tapered.

6. The bezel and chassis assembly of claim 4 wherein the one or more pins extend farther into the holes of the chassis than the one or more snap latches extend into the slots.

7. A method of attaching a bezel to a chassis comprising:
   aligning pins extending from the bezel with corresponding holes in the chassis;
   partially inserting the pins into the holes;
   flexing snap latches on the bezel;
   pressing the bezel onto the chassis; and
   releasing the snap latches.

* * * * *

UNITED STATES PATENT AND TRADEMARK OFFICE
CERTIFICATE OF CORRECTION

PATENT NO.    : 6,156,972
DATED         : December 5, 2000
INVENTOR(S)   : Michael Wortman Page 1 of 1

It is certified that error appears in the above-identified patent and that said Letters Patent is hereby corrected as shown below:

Column 3,
Line 30, after "of the" delete "from a face of the"

Column 4,
Line 1, before second "chassis" delete "chassis on which the the bezel is positioned"
Line 1, after second "chassis" insert -- from a face of the chassis on which the bezel is positioned --
Line 14, after "of the" delete "from a face"
Line 15, before second "chassis" delete "of the chassis on which the bezel is positioned"
Line 15, after second "chassis" insert -- from a face of the chassis on which the bezel is positioned --

Signed and Sealed this

First Day of October, 2002

*Attest:*

*Attesting Officer*

JAMES E. ROGAN
*Director of the United States Patent and Trademark Office*